United States Patent [19]

Karlsen

[11] Patent Number: 4,852,519
[45] Date of Patent: Aug. 1, 1989

[54] PROCESS AND DEVICE FOR MEDICAL TREATMENT OF FISH

[75] Inventor: Jakob Karlsen, Ekkilsoy, Norway
[73] Assignee: Aqua Fisk A/S, Ekkilsoy, Norway
[21] Appl. No.: 84,381
[22] Filed: Aug. 11, 1987
[30] Foreign Application Priority Data
Aug. 14, 1986 [NO] Norway ................................ 863290
[51] Int. Cl.⁴ .............................................. A01K 61/00
[52] U.S. Cl. ........................................................ 119/3
[58] Field of Search ............................................ 119/3
[56] References Cited

U.S. PATENT DOCUMENTS

| | | | |
|---|---|---|---|
| 3,320,928 | 5/1967 | Smith | 119/3 |
| 3,452,966 | 7/1969 | Smolski | 119/3 X |
| 3,653,358 | 4/1972 | Fremont | 119/3 |
| 3,698,359 | 10/1972 | Fremont | 119/3 |
| 3,699,224 | 10/1972 | Yamasaki et al. | 119/3 X |
| 4,110,467 | 8/1978 | Sano et al. | 119/3 X |
| 4,522,151 | 6/1985 | Arbisi et al. | 119/3 |

FOREIGN PATENT DOCUMENTS

1913703 5/1970 Fed. Rep. of Germany .
154680 8/1986 Norway .

*Primary Examiner*—Robert P. Swiatek
*Attorney, Agent, or Firm*—Hubbard, Thurman, Turner & Tucker

[57] ABSTRACT

Process for medical treatment of fish using a medical compound where the medication is delivered directly of the water where the fish is raised/kept. The delivery of medication is performed from a separate container through a pumping device to a spreading nozzle in the seine.

15 Claims, 9 Drawing Sheets

PROCESS AND DEVICE FOR MEDICAL TREATMENT OF FISH

BACKGROUND OF THE INVENTION

1. FIELD OF THE INVENTION

This invention relates to an improved process for medical treatment of fish employing a nozzle apparatus for spreading the medication in the water.

2. DESCRIPTION OF THE PRIOR ART

There exist today several methods for delousing of fish where each method works with varying efficiency and gives variable results. One of the main methods used today in medical treatment of fish is one where the net containing the fish to be treated is drawn up so that the fish may swim over into another enclosure containing medication where treatment takes place. Normally, such treatment will last between fifteen and thirty minutes.

This process is cumbersome and time consuming since it involves both drawing of the nets and subsequent loosening of the nets after treatment of the fish and the fish must be kept in the enclosure containing the medication for a certain time. In addition, the fish may be damaged by the drawing of the net. The appetite of the fish is reduced by this type of treatment due to harsh treatment and due to the rapidly changing environment of the fish between a larger cultivating net and a smaller medication bag.

SUMMARY OF THE INVENTION

In fish farming, parasites and fish diseases such as salmon louse can be a great nuisance and create great losses. The purpose of the present invention is to achieve an improved method for medical treatment of fish to prevent these losses. This is achieved by mixing the medication in a separate container such as a tight cloth. Thereafter, the medication is continuously supplied directly into the cultivation net for a prolonged period by means of a pumping device, a hose system, and one or more spreading nozzles placed in an assembled condition in the cultivation net. It has been found that this treatment by prolonged supply of the medical compound at diluted concentrations gives better results than the previous methods of netting the fish into a separate treatment bag. At the same time, the new technique does not stress the fish or damage the fish. In addition, the medical compounds may be supplied to the fish through a closed system minimizing human contact with the compounds.

DETAILED DESCRIPTION OF THE PREFERRED EMBODIMENT

Figure 1:
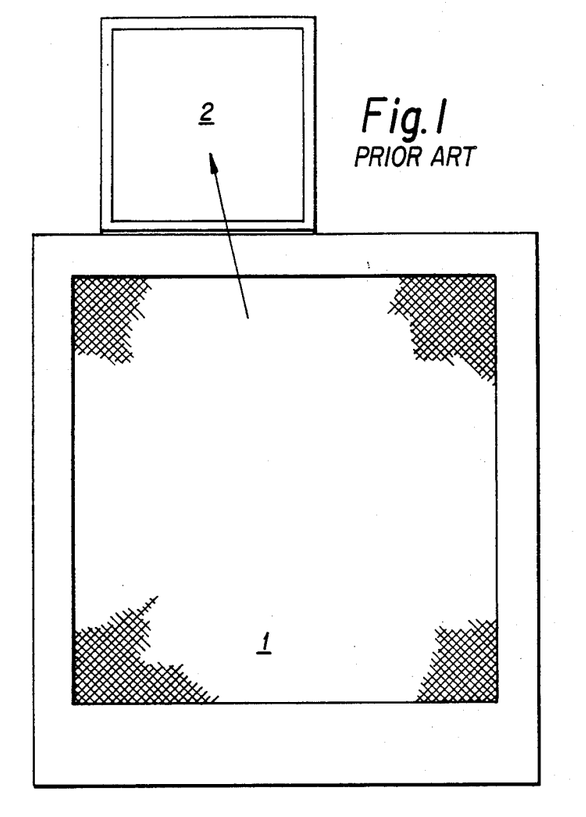
FIG. 1 is a top view of a prior art breeding net and delousing container.
Figure 2:
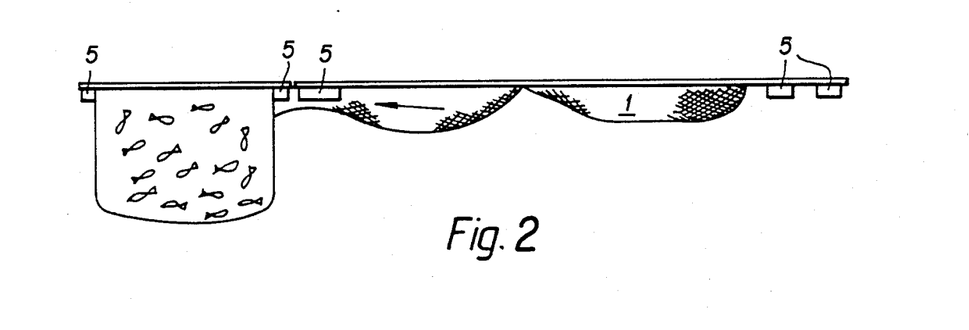
FIG. 2 is a side view of the FIG. 1 apparatus.

In FIGS. 1 and 2, a previously known device for medical treatment of fish is shown where the fish are transferred to a separate treatment container 2 containing the medication by raising the cultivation net or seine 1. This method leads to previously mentioned disadvantages. An embodiment of this known method may comprise a treatment bag 2 having a surface area of 25 square meters (5 m×5 m) and a depth of 2.4 meters giving a volume of 60 cubic meters. By this embodiment of known technique, the fish have to swim over into the medication bag, as indicated by the arrow, and may be hurt in the transfer.

The process for medical treatment of fish according to the present invention is performed by mixing the medication or compound with physiological action in the water which surrounds the fish and the process is further defined in that the medication is supplied under controlled conditions to where the fish are raised and live. The medication is supplied at a desired concentration, by pressure, through at least one nozzle below the water surface.

The apparatus by which the medication is delivered and distributed in the water includes a nozzle or nozzles connected to a pump which may be of any kind that can deliver the medication in a controlled manner. The nozzles may consist of several separate nozzle arrangements below each other so that the medication is delivered separately and/or simultaneously in different layers of water. Regulation and control of the dissolved gasses (oxygen and/or nitrogen) in the water as well as control of the water temperature are other conditions which may be controlled as part of the process through well known apparatus.

By delivering the medication to the water in a controlled manner one avoids a large initial concentration in the vicinity where the medication is discharged. Also avoided is the subsequent dilution of the medication since the medication is delivered to the water continuously through the nozzles. Thus, a substantially uniform distribution of concentration is achieved.

Figure 3:
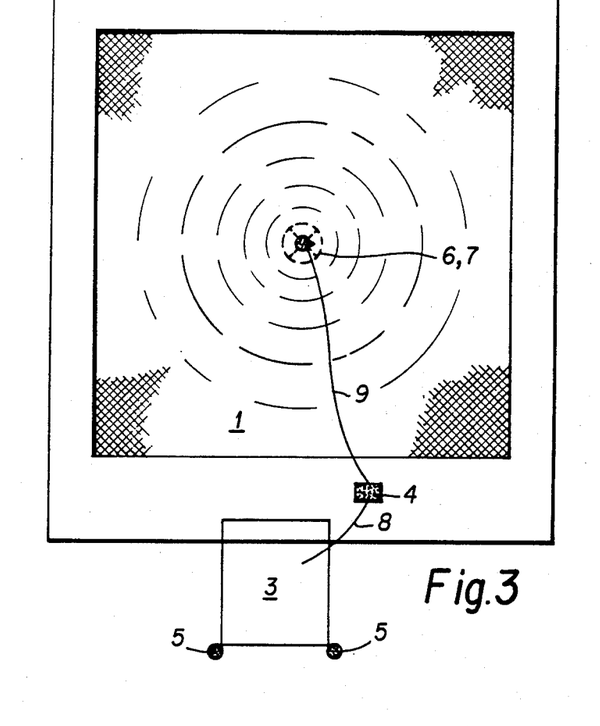
FIG. 3 is a top view of a breeding net with a container for medication to be used in accordance with the present invention.
Figure 4:
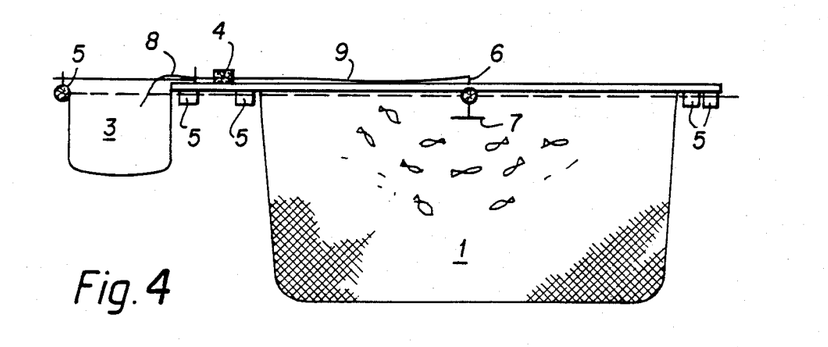
FIG. 4 is a side view of the FIG. 3 apparatus.
Figure 5:
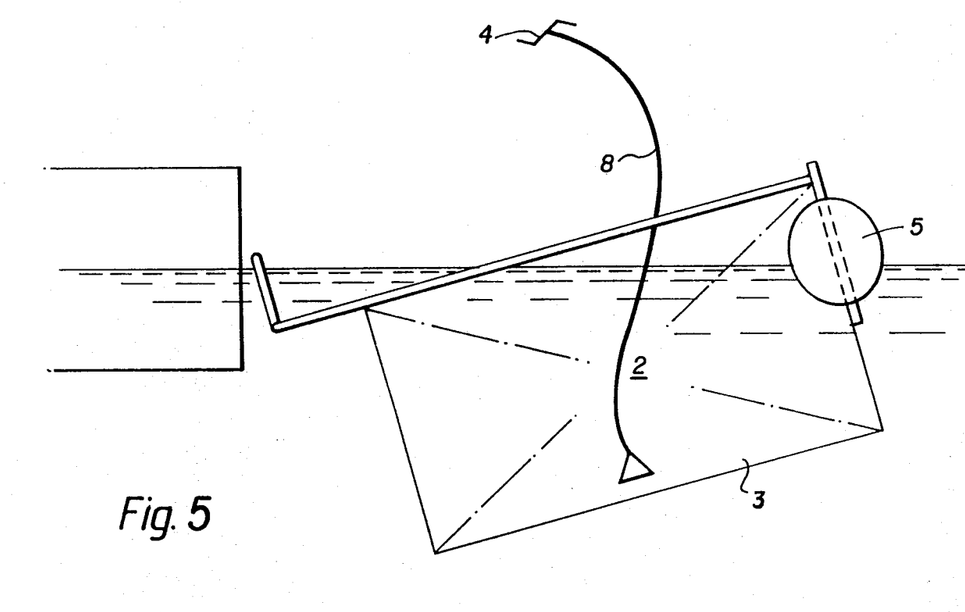
FIG. 5 shows an embodiment of the container for medication during use.
Figure 6:
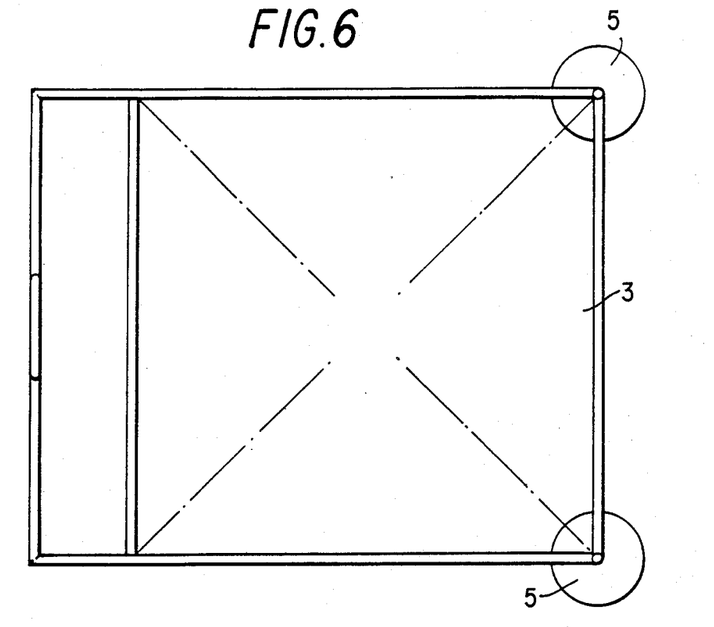
FIG. 6 shows a top view of the container for medication depicted in FIG. 5.
Figure 7:
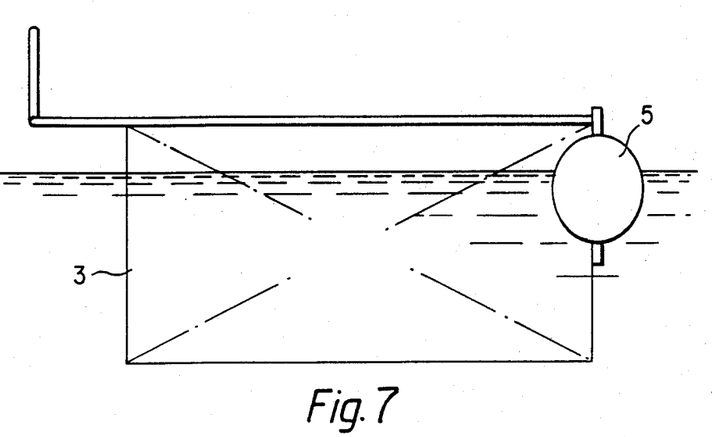
FIG. 7 is a side view of the FIG. 6 apparatus.
Figure 10:
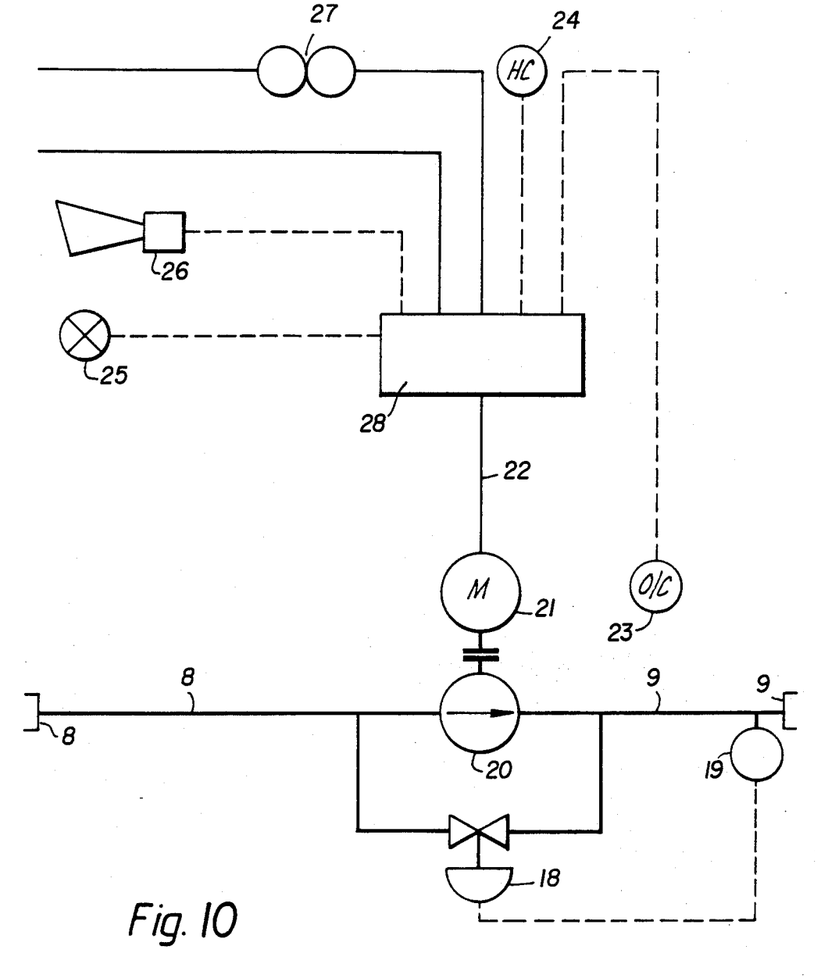
FIG. 10 shows a pumping device for use in supplying medication to the fish net according to the present invention.
Figure 11:
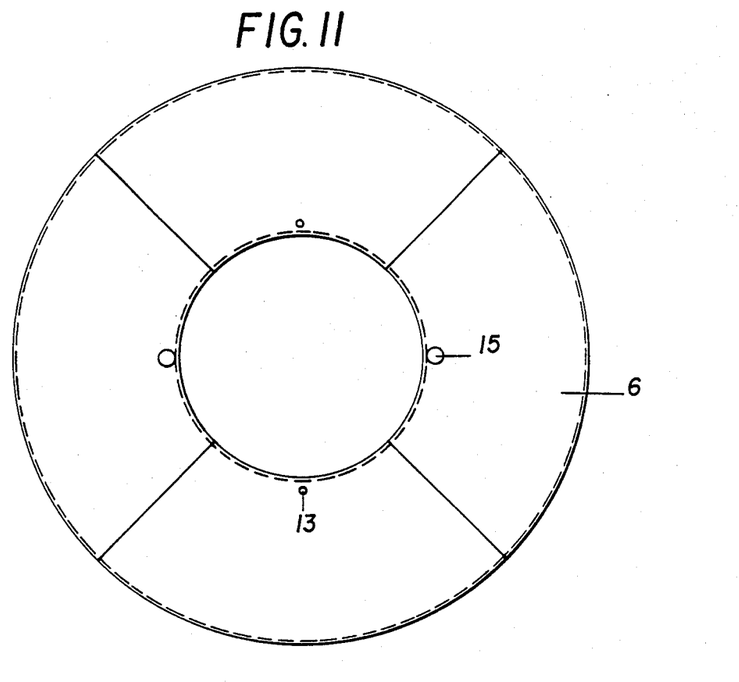
FIG. 11 shows a top view of a further embodiment of the floating device of the nozzle.
Figure 12:
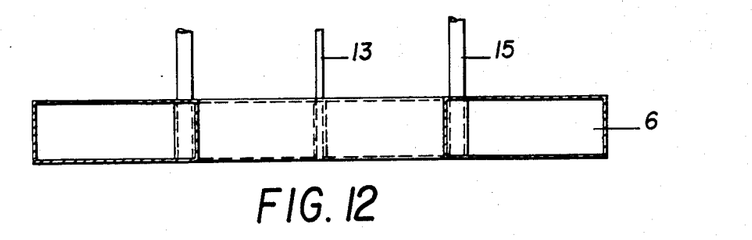
FIG. 12 shows a side view of the apparatus of FIG. 8.
Figure 13:
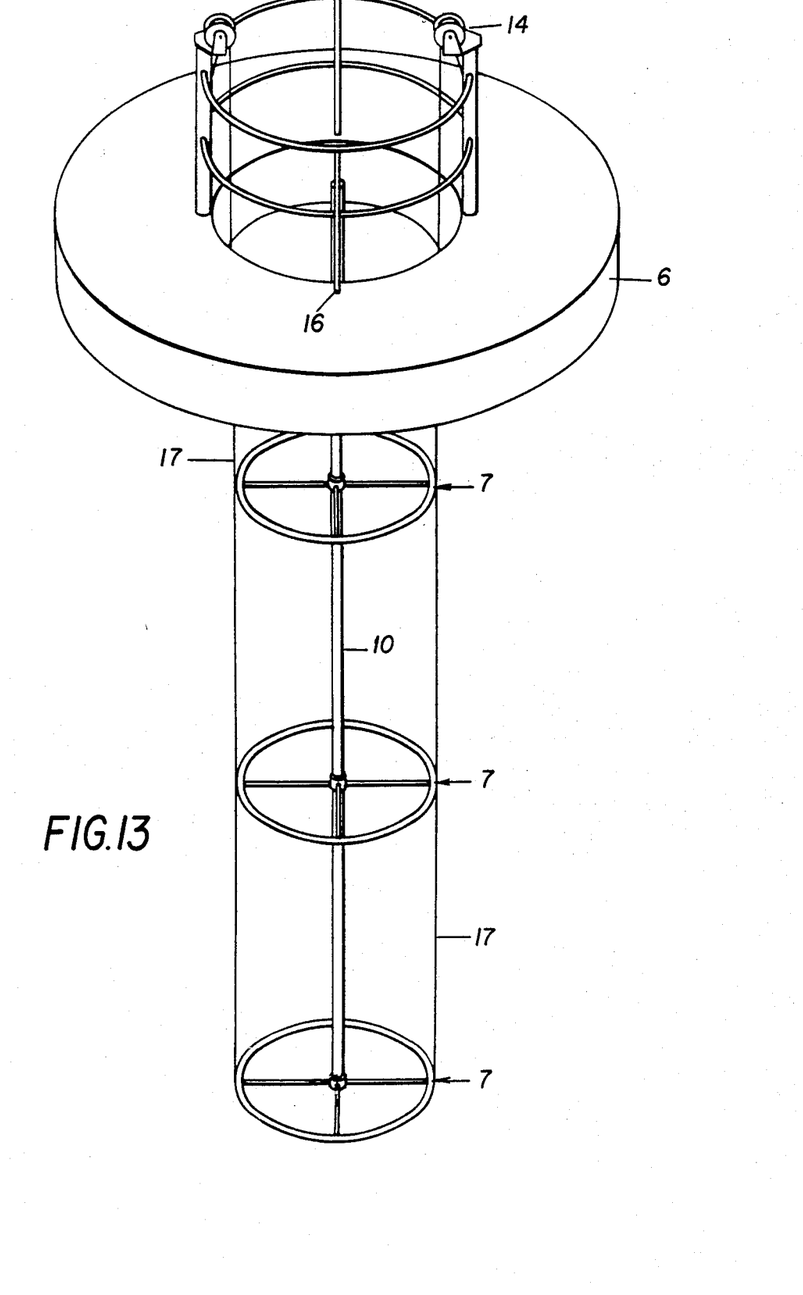
FIG. 13 shows a further embodiment of the spreading nozzle for the medication.

In FIGS. 3 and 4, there is shown a device for medical treatment of fish according to the present invention where a medical compound such as one sold under the trademark NEGUVON first is mixed in a separate container 3 which may consist of a tight cloth or a container such as that illustrated in FIGS. 5–7. The container 3 may, according to one embodiment have a volume of 12 cubic meters where the medication is mixed in a quantity of 120 grams NEGUVON per cubic meter. This leads to the additional advantage that the container for medication according to the invention is of smaller dimensions than previously used containers and thus easier to handle and transport. The container for the medication is kept afloat by floating devices 5 and may also be fastened to a floating pier as shown in FIG. 5. FIGS. 6 and 7 show an embodiment of the container 3 during use. After the mixing is done, the medication is transported from the mixing container 3 to the cultivating net or seine 1 via transport lines 8,9 using a pumping device 4, a special embodiment of which is shown in FIG. 10. Transport line 8 carries medication from the mixing container 3 to the pump 4 and transport line 9 carries medication from the pump 4 to the nozzle 7. The medication is spread in the seine or net 1 using one or several spreading nozzles 7 which are kept afloat by using floating device 6 such as pontoons. A delivery ring 11 containing delivery holes 13 for smooth delivery of the medication may be located at an appropriate level such as one meter below the surface. More spreading nozzles may be assembled below the uppermost spreading nozzle in a fasion similar to that shown in FIG. 13. FIG. 13 shows an embodiment having a floating device 6, a plurality of nozzles 7, a conventional lifting device 14, a protective railing structure 15, and wire lines 16 attached at opposite sides of the nozzles to facilitate lifting of the structure. FIGS. 11 and 12 show details of the floating device 6 employed in the embodiment of FIG. 13. The distance between each nozzle and the distance between the uppermost nozzle and the surface may in one embodiment be 1.3 meters and in another it may be 2 meters. In an embodiment such as that shown in FIG. 2, the seine or net may have a surface of 100 square meters (10 m.×10 m.) and the mixing container 3 may have a surface of 6.25 square meters (2.5 m×2.5 m.).

Figure 8:
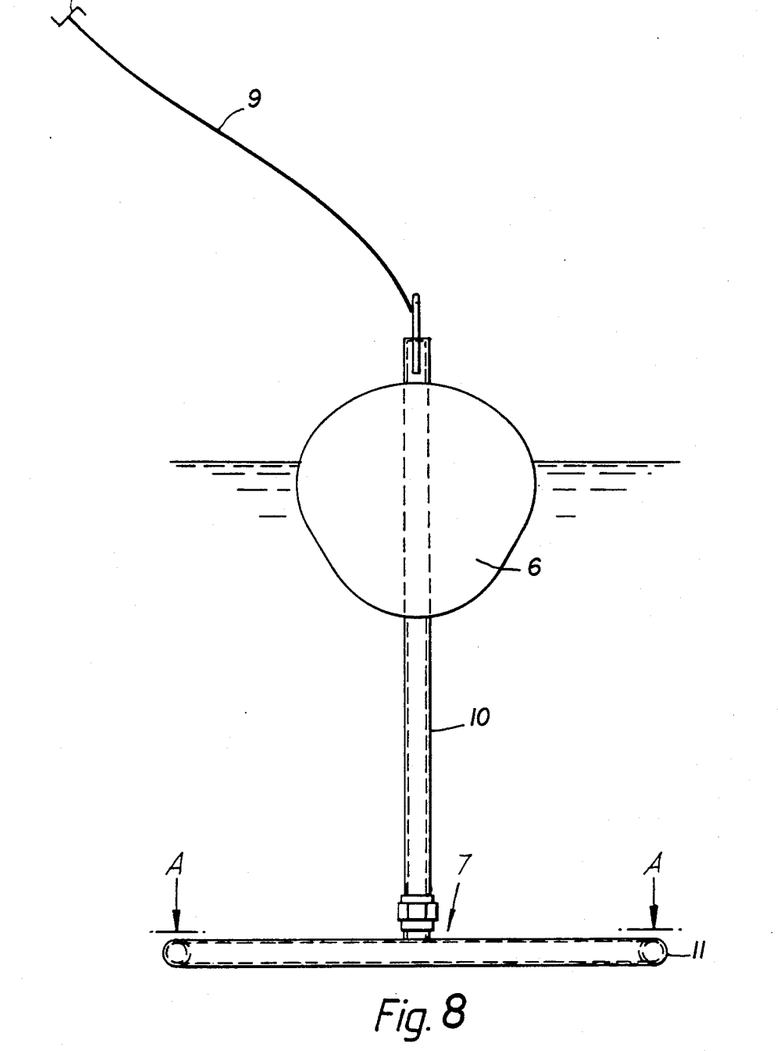
FIG. 8 shows an embodiment of the spreading nozzle for medication according to the invention.
Figure 9:
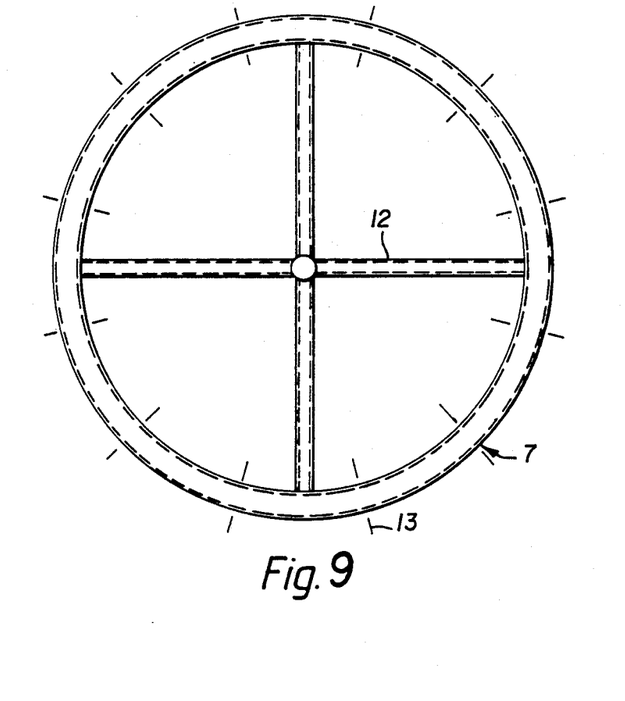
FIG. 9 shows a cross-sectional view cut through at the line A—A in FIG. 8.

The spreading nozzle 7 seen also in FIGS. 8 and 9 may in a preferred embodiment be made of water resistant material fashioned so as to include a space pipe 10 approximately 38.1 millimeters in diameter and 1.3 to 2 meters in length and peripheral pipe of the same diameter forming a ring 11 including holes 13 therein. Radially placed spreading pipes 12 in the spreading nozzle seen best in FIG. 9 may consist of pipes with a dimension of 19.1 millimeters. Near the uppermost part of the space pipe 10 there is fastened a floating pontoon 6 and the coupling between the space pipe 10 and supply hose 9 may be made with a quick disconnect or fast coupling. On top of the space pipe 10 there may be a hoop mounted for attachment of the spreading nozzle to shore or to a pier The present invention also comprises a coupling for the pumping device as shown in FIG. 10 for delivery of medication to the raising net or seine. FIG. 10 schematically illustrates a pump control device including: an automatic bypass regulation valve 18; a device 19 for measurement of quantity which in turn regulates the bypass valve 18; a pump 20; a pump motor 21; an energy supply line 22 for the pump; an oxygen measuring device 23 to be placed in the net or seine; a clock 24 for controlling the motor; a light signal 25; a signal horn 26; and a transformer 27, and a circuit box 28.

Many of the medical compounds used for treatment of parasite attacks such as salmon louse and fungus on fish for cultivation may be harmful both for humans and fish. It is thus important that the chemicals are handled with care and that the dosage is measured properly according to the specifications provided by the manufacturer, veterinarian, or pharmacy.

Skin contact with powder or liquid or inhalation of dust or vapors may give allergic reactions, asthma, rash or skin damage. Some compounds may be very caustic. Spurts of such compounds may give serious injuries such as eye damage or blindness.

Bacteria which normally are present on humans may be affected by the compounds. This may result in some bacteria developing a resistance to the compounds so that bacterial infections get more difficult to treat. Color bacteria may also be affected so that the digestion is altered. Some of the medical compounds which are used in the medical treatment of fish may also be mutagenic in greater concentrations and/or carcinogenic. In addition some of the compounds may cause acute poisoning or fetus damage if pregnant women are exposed to them.

All these disadvantages are present both for fish and breeders when medical compounds are applied at high concentrations. The dangers are greater with above water procedures such as mixing in a separate treatment bag according to previous technique.

Some of the most frequently used medications in the treatment of fish for diseases and parasites are compounds such as NEGUVON, NUVAN, choroamine, and formaldehyde. All of these require general use of protection. In working on fish seines in bad weather and at open sea, skin contact with such compounds will, however, be almost inevitable.

It has now been found that medical treatment of fish by prolonged supply of the medical compound at diluted concentrations gives better results than the previous method of netting the fish in a separate treatment bag. At the same time, the new technique does not stress the fish or expose them to high concentrations of chemicals. Additionally, the medical compounds may be supplied through a closed system to the seines or nets which prevents the human contact with the compounds. It has further been found that the new process requires 60 percent less quantity of medication. Testing of the process and apparatus described above has resulted in 100 percent removal of salmon louse and sea water costia with no loss of fish.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

I claim:

1. A process for the medical treatment of fish living in water including the steps of:
   providing a liquified mixture of medication at a desired concentration in a container;
   delivering the medication mixture to the water where the fish live in a continuous, controlled manner through nozzle means located below the surface of the water;
   whereby the fish are bathed in a substantially uniform relatively dilute concentration of medicine for a prolonged period of time.

2. A process according to claim 1 characterized in that the step of delivering the medication mixture is carried out through a plurality of nozzles placed at varying depths below the surface.

3. A process according to claim 2 characterized in that the medication mixture is delivered to the nozzle means through a controlled pump means.

4. A process according to claim 1 characterized in that the medication mixture is delivered to the nozzle means through a controlled pump means.

5. A process according to claim 1 characterized in that the medication mixture is delivered under conditions where the amount of dissolved gasses in the water is controlled.

6. A process according to claim 1 characterized in that the medication mixture is delivered under conditions where the temperature of the water is controlled.

7. A process according to claim 1 characterized in that the medication mixture is delivered under conditions where the temperature of the water and the amount of dissolved gasses in the water are controlled.

8. A process according to claim 1 characterized in that the medication mixture is delivered under conditions where the amount of oxygen in the water and the temperature of the water are controlled.

9. A process for administering anti-parasite and/or anti-bacterial medications to water in which fish are raised wherein a solution medication is supplied continuously under pressure to the water in which the fish are raised from at least one nozzle placed below the surface so as to bathe the fish in a relatively dilute concentration of medicine for a prolonged period of time under controlled conditions.

10. A process according to claim 9 characterized in that the spreading of the medication is performed through spreading nozzles placed at several depths below the surface of the water.

11. A process according to claim 10 characterized in that the controlled administration of medication is performed by a suitable pumping device.

12. A process according to claim 9 characterized in that the controlled administration of medication is performed by a suitable pumping device.

13. A process according to claim 9, characterized in that the administration of medication is performed by observation of the content of dissolved gasses in the water.

14. A process according to claim 9, characterized in that the administration of medication is performed by observation of the termperature of the water.

15. A process according to claim 9, characterized in that the administration of medication is performed by observation of the content of dissolved gasses in the water and the temperature of the water.

* * * * *